United States Patent
Noguchi et al.

(10) Patent No.: US 12,524,178 B1
(45) Date of Patent: Jan. 13, 2026

(54) INTERFACE MODULE THAT ALLOWS FOR COMMUNICATION BETWEEN DEVICES WITH DIFFERENT COMMUNICATION PROTOCOLS

(71) Applicant: Hitachi, Ltd., Tokyo (JP)

(72) Inventors: Takashi Noguchi, Tokyo (JP); Nobuhiro Yokoi, Tokyo (JP)

(73) Assignee: HITACHI VANTARA, LTD., Yokohama (JP)

( * ) Notice: Subject to any disclaimer, the term of this patent is extended or adjusted under 35 U.S.C. 154(b) by 82 days.

(21) Appl. No.: 18/243,288

(22) Filed: Sep. 7, 2023

(30) Foreign Application Priority Data

Mar. 30, 2023 (JP) ................................ 2023-054705

(51) Int. Cl.
*G06F 3/06* (2006.01)
(52) U.S. Cl.
CPC ............ *G06F 3/0655* (2013.01); *G06F 3/061* (2013.01); *G06F 3/0679* (2013.01)
(58) Field of Classification Search
CPC .............................. G06F 3/0655; G06F 3/061
See application file for complete search history.

(56) References Cited

U.S. PATENT DOCUMENTS

| | | | |
|---|---|---|---|
| 2005/0265377 A1 | 12/2005 | Mizuno et al. | |
| 2018/0300064 A1* | 10/2018 | McGlaughlin | G06F 13/1673 |
| 2019/0286583 A1* | 9/2019 | Nagao | G06F 13/102 |
| 2021/0055958 A1* | 2/2021 | Kirubakaran | G06F 9/4831 |
| 2024/0031295 A1* | 1/2024 | Bharadwaj | H04L 47/263 |
| 2024/0241639 A1* | 7/2024 | Wang | G06F 3/067 |

FOREIGN PATENT DOCUMENTS

JP 2005-339323 A 12/2005

* cited by examiner

*Primary Examiner* — Nicholas A. Paperno
(74) *Attorney, Agent, or Firm* — MATTINGLY & MALUR, PC

(57) ABSTRACT

An interface module connected to a storage controller and relaying communication between a host and the storage controller. The host and the storage controller use different communication protocols, include computing cores and a memory. At least one of the computing cores is a IO core in communication with the host, each of the IO cores has a virtual queue in the memory and the IO core is configured to execute a reception process of converting communication data including a command to the storage controller outputted by the host into a storage interface command and store the communication data in the virtual queue. The IO core executes a sending process for sending to the host by converting to communication data takes out a storage interface command from the virtual queue, and in same session, same IO core performs the reception process and the transmission process.

6 Claims, 18 Drawing Sheets

FIG. 2

23 CONTROLLER DRAM

231 SESSION MANAGEMENT TABLE

| SESSION ID | PROTOCOL SETTING INFORMATION | NETWORK SETTING INFORMATION | LUN MAPPING INFORMATION |
|---|---|---|---|
| E1 | ISCSI SETTING | TCP SETTING IP SETTING | #1 - 20 |
| .... | .... | .... | ... |
| E100 | NVME OVER TCP SETTING | TCP SETTING IP SETTING | #1 - 20 |

232 CPU SETTING LIST

| CHB ID | QUEUE OPERATION-DEDICATED MODE | QUEUE OPERATION-SHARED MODE | PORT 0 CPU RESOURCE | PORT 1 CPU RESOURCE |
|---|---|---|---|---|
| C1 | No | Yes | 50% | 50% |
| C2 | No | Yes | 100% | 0% |
| C3 | Yes | No | 60% | 40% |

233 PROTOCOL SETTING LIST

| CHB ID | ISCSI TARGET | | ISCSI INITIATOR | | NVME OVER TCP | | ROCE V2 | |
|---|---|---|---|---|---|---|---|---|
| | PORT0 | PORT1 | PORT0 | PORT1 | PORT0 | PORT1 | PORT0 | PORT1 |
| C1 | O | - | - | - | - | O | - | - |
| C2 | - | - | - | - | - | - | O | O |
| C3 | - | O | - | - | O | O | - | - |

FIG. 3

DRAM    CHB ID: C1 (31)

CONNECTION MANAGEMENT TABLE   PORT 0 (311)

| CONNECTION ID | CORE NUMBER | CONNECTION INFORMATION | TASK ID | | |
|---|---|---|---|---|---|
| N1 | R0 | CONNECTION SETTINGS | T0X1743 | ·· | T0X13311 |
| ... | ... | ... | ... | ... | ... |
| N255 | R7 | CONNECTION SETTINGS | T0X1114 | ·· | T0X1783 |

TASK MANAGEMENT TABLE   CONNECTION ID: N1 (312)

| TASK ID | PDU1 | PDU2 |
|---|---|---|
| T0x1743 | WAITING IO RESPONSE | IO REQUESTING |
| ... | ... | ... |
| T0x1443 | IO CANCELLING | LOGOUT REQUESTING |

CPU MANAGEMENT TABLE (313)

| CORE NUMBER | CONNECTION ID | | | TASK ID | | |
|---|---|---|---|---|---|---|
| R0 | N1 | ·· | N9 | T0x1743 | ·· | T0x13311 |
| ... | ... | ... | ... | ... | ... | ... |
| R7 | N108 | ·· | N255 | T0x1114 | ·· | T0x1783 |

FIG. 4

31
DRAM    CHB ID: C1

314

| PROTOCOL SETTING TABLE | |
|---|---|
| PORT0 | PORT1 |
| ISCSI TARGET | NVME OVER TCP |

315

| CPU SETTING TABLE | | | |
|---|---|---|---|
| QUEUE OPERATION-DEDICATED MODE | QUEUE OPERATION-SHARED MODE | CPU RESOURCE OF PORT 0 | CPU RESOURCE OF PORT 1 |
| NO | YES | 50% | 50% |

FIG. 6
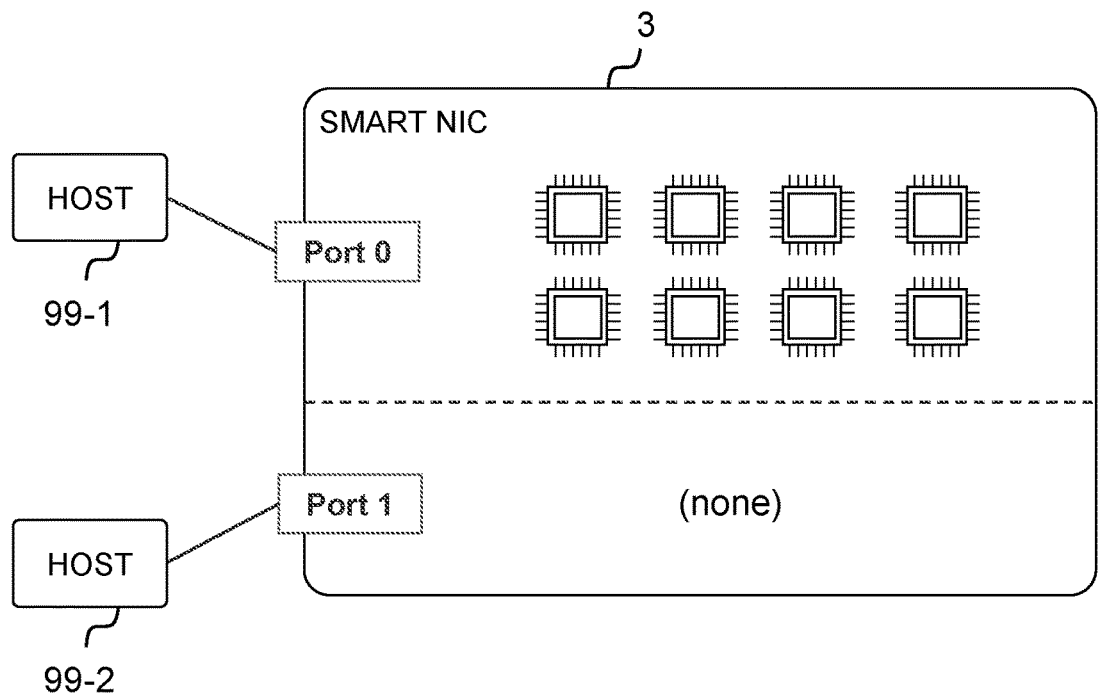
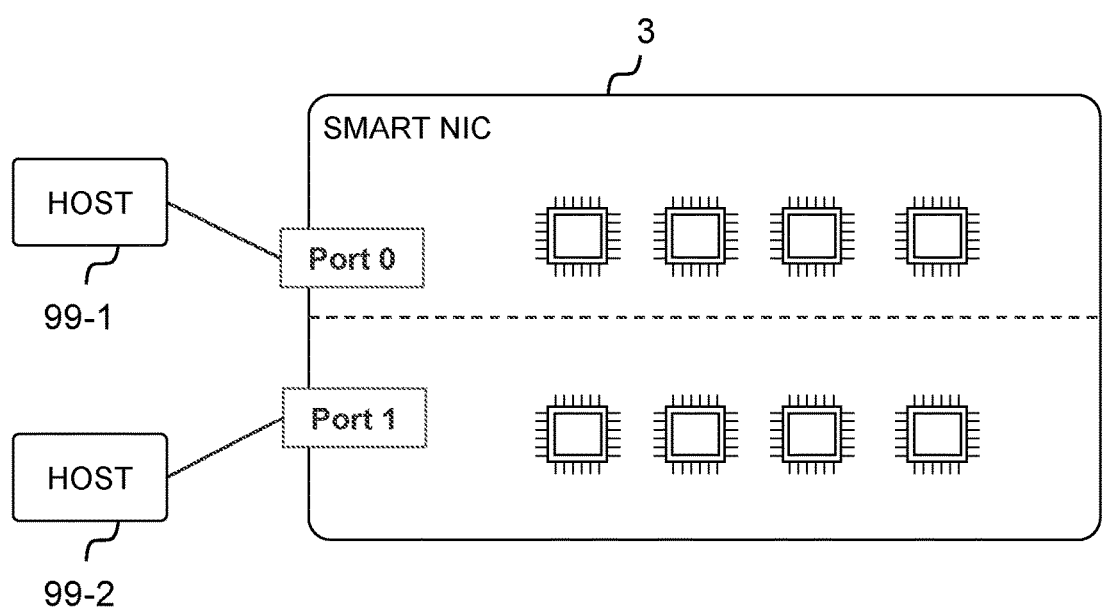

FIG. 8
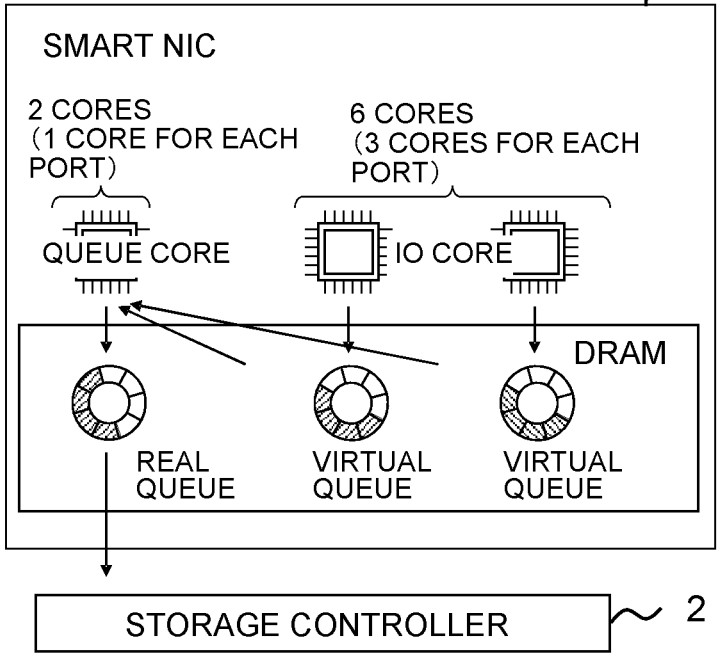
QUEUE OPERATION-DEDICATED MODE
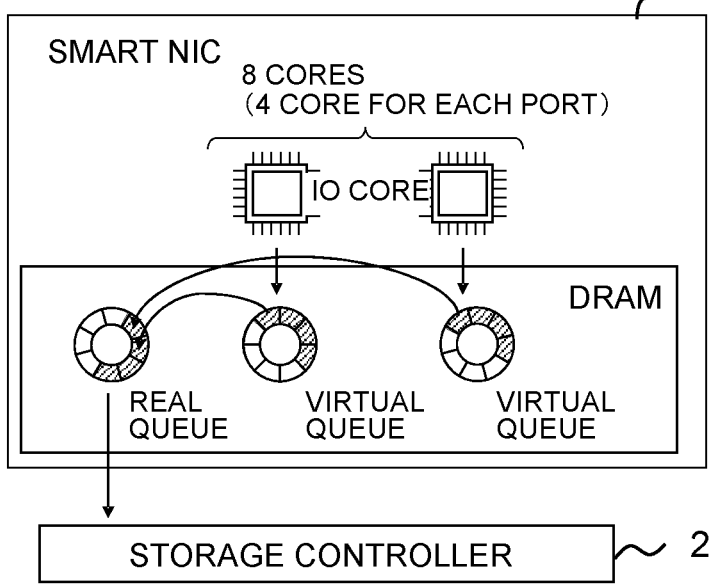
QUEUE OPERATION-SHARED MODE FIG. 18
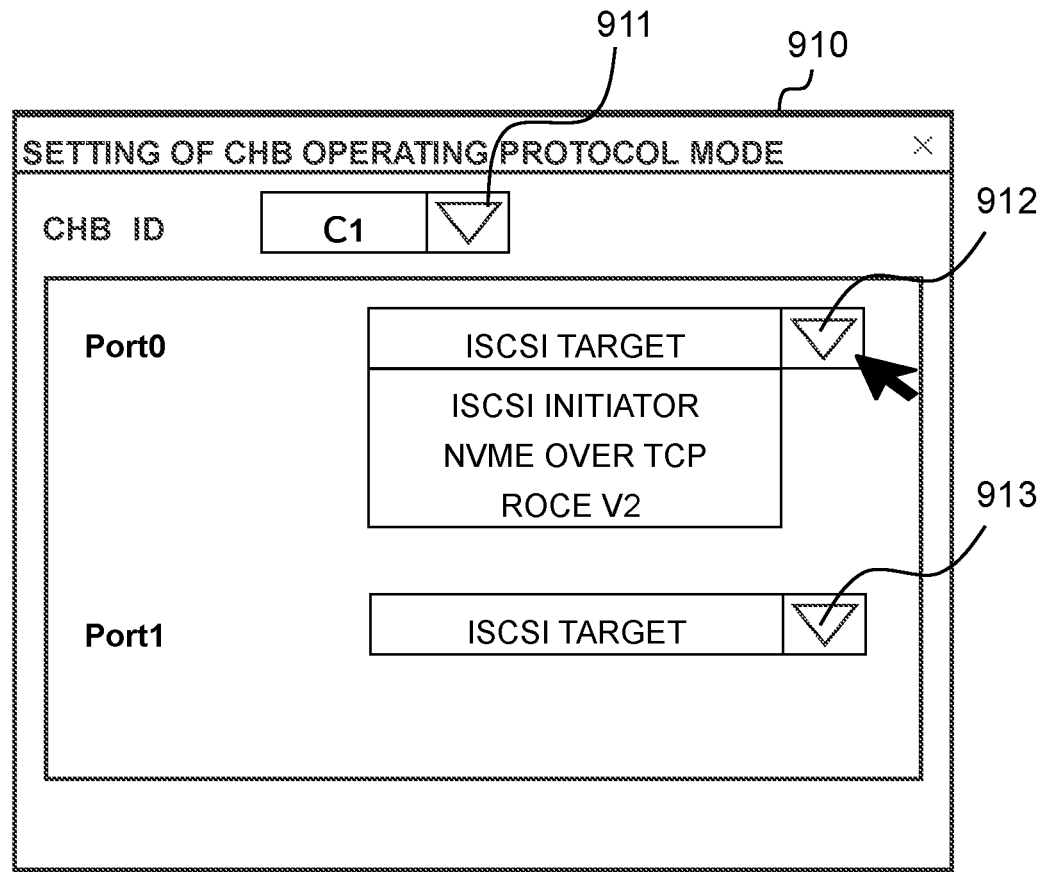
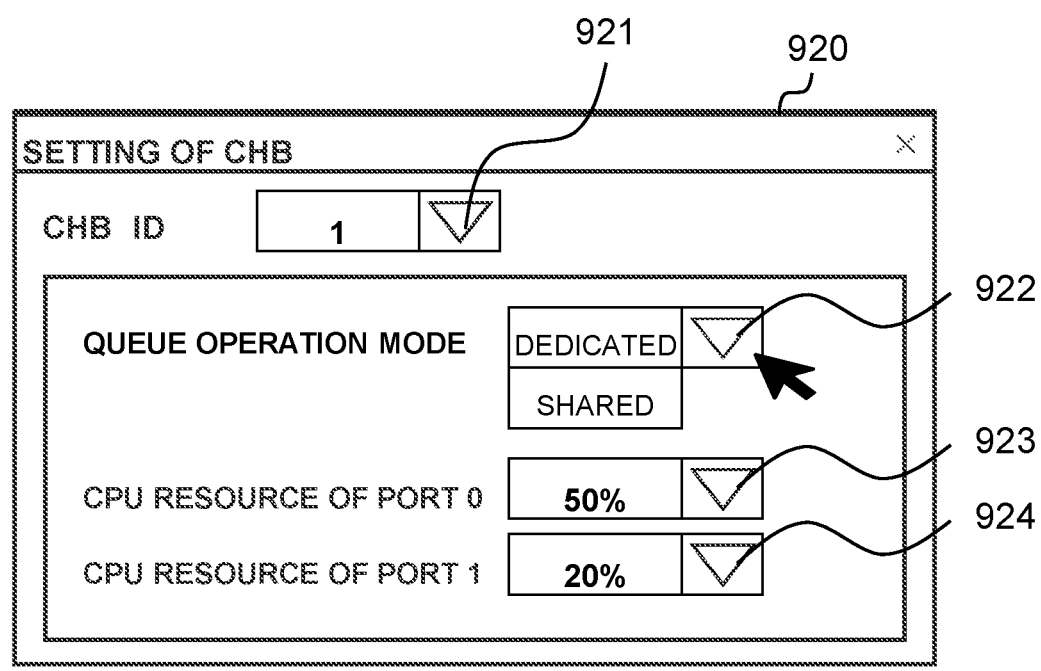

INTERFACE MODULE THAT ALLOWS FOR COMMUNICATION BETWEEN DEVICES WITH DIFFERENT COMMUNICATION PROTOCOLS

CROSS-REFERENCE TO RELATED APPLICATION

The present application claims priority from Japanese application JP2023-054705, filed on Mar. 30, 2023, the content of which is hereby incorporated by reference into this application.

TECHNICAL FIELD

The present invention relates to interface module, computing device, and communication method.

BACKGROUND ART

New communication protocols are being developed every day based on new technologies. The following interface module is disclosed in Japanese Laid-Open Patent Publication No. 2005-339323. This interface module has a serial signal transmitter/receiver connected to an external transmission line, an interface processing unit connected to the above transmitter/receiver, a serial-to-parallel converter, a coding/decoding unit connected to the above serial-to-parallel converter, and a protocol processing unit connected to the above coding/decoding unit to selectively perform at least two types of protocol processing. The interface processing section is connected to the above-mentioned transmitter/receiver. The interface processing section converts serial signals received from the above transmitter/receiver section into parallel signals. The serial-to-parallel converter converts parallel signals to be sent to the above external transmission line into serial signals and outputs them to the above transmitter/receiver. Furthermore, the communication mode switching means is provided to switch the basic clock frequency supplied to the above serial-parallel converter in conjunction with the switching of the above protocol processing.

SUMMARY OF INVENTION

Technical Problem

The invention described in Japanese Laid-Open Patent Publication No. 2005-339323 has room for improvement in coping with new communication protocols.

Solution to Problem

According to the 1st aspect of the present invention, An interface module connected to a storage controller and relaying communication between a host and the storage controller, wherein the host and the storage controller use different communication protocols, includes a plurality of computing cores and memory, wherein: at least one of the plurality of computing cores is a IO core in communication with the host, each of the IO core has a virtual queue in the memory, the IO core is configured to execute a reception process of converting communication data including a command to the storage controller outputted by the host into a storage interface command and storing the communication data in the virtual queue, the IO core executes a sending process for sending to the host by converting to communication data takes out a storage interface command from the virtual queue, and in same session, same IO core performs the reception process and the transmission process.

According to the 2nd aspect of the present invention, a computing device includes: an interface module capable of communicating with a host, a storage controller communicating with the host via the interface module, a plurality of computing cores, and memory, wherein: the host and the storage controller use different communication protocols, at least one of the plurality of computing cores is a IO core in communication with the host, each of IO cores has a virtual queue in the memory, the IO core is configured to execute a reception process of converting communication data including a command to the storage controller into a storage interface command and storing the communication data in the virtual queue, the IO core executes a sending process for sending to the host by converting to communication data takes out a storage interface command from the virtual queue, in the same session, the reception process and the transmission process are executed by the same IO core.

According to the 3rd aspect of the present invention, a communication method for communicating executed by an interface module including a plurality of computing cores and a memory, the module relays communication between a host and the storage controller, the module is locally connected to a storage controller, includes, wherein each of IO cores has a virtual queue in the memory, the IO core executing reception process that converts a communication data including a command to the storage controller output from the host into a storage interface command and stores the storage interface command to the virtual queue, the IO core executing transmission process that converts storage interface command from the virtual queue to communication data and transmits the communication data to the host, and same IO core executing the reception process and the transmission process in same session.

Advantageous Effects of Invention

According to the present invention, new communication protocols can be easily adapted.

BRIEF DESCRIPTION OF DRAWINGS

FIG. 2 is a diagram showing an example of the session management table, the CPU setting list, and the protocol setting list stored in the controller DRAM.

FIG. 3 is a diagram showing an example of the connection management table, a task management table, and a CPU management table stored in a DRAM.

FIG. 4 is a diagram showing an example of the protocol setting table and the CPU setting table stored in a DRAM of a smart NIC.

FIG. 6 is a diagram showing an example of the allocation of CPU cores in the communication module.

FIG. 8 is a diagram for explaining the queue operation-dedicated mode and the queue operation-shared mode.

FIG. 18 is a diagram showing an example of the setting window generated by CHB setting program.

DESCRIPTION OF EMBODIMENTS

Figure 1:
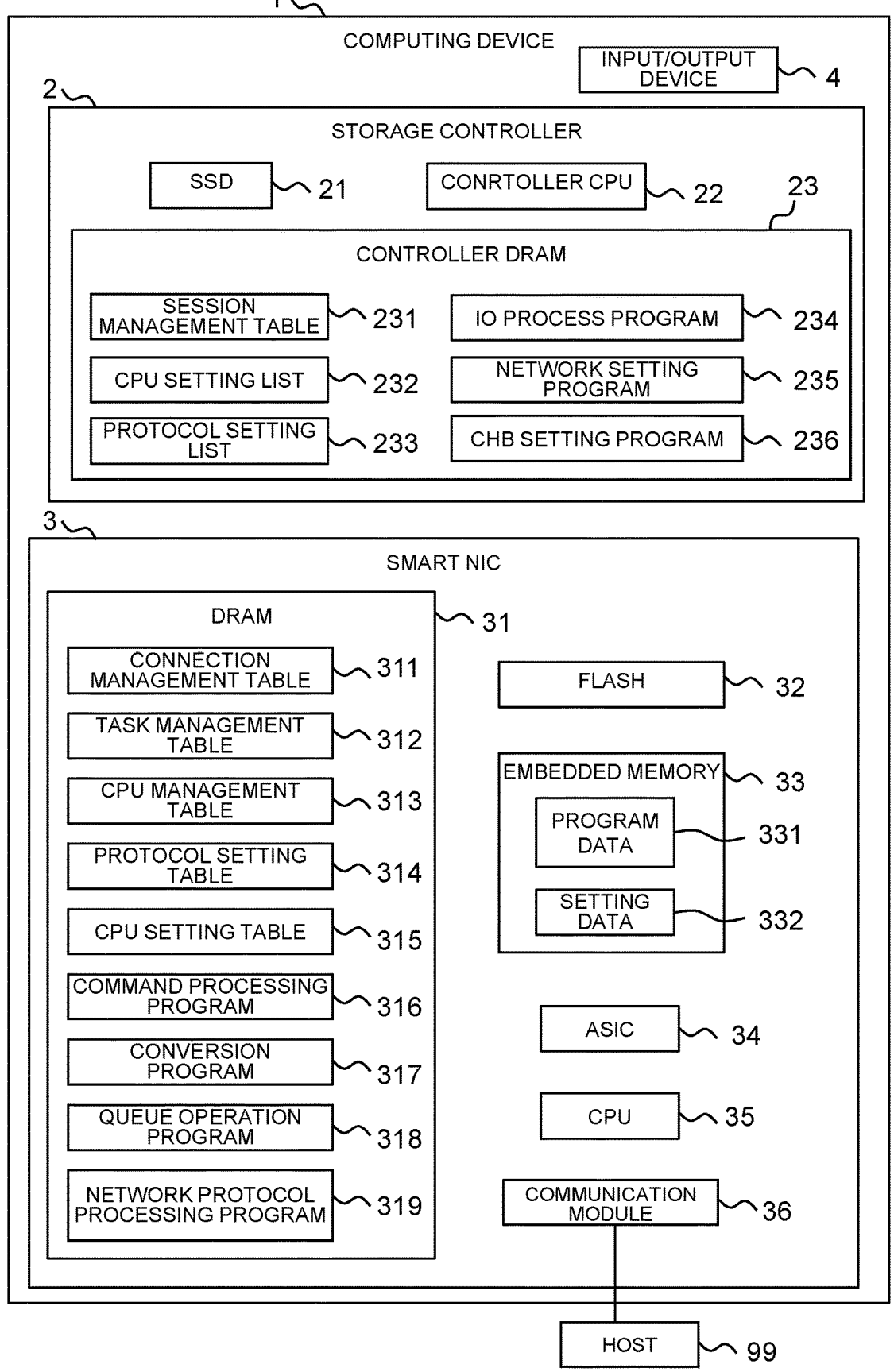
FIG. 1 is a configuration diagram of a computing device including a smart NIC.

FIG. 1 is a configuration diagram of a computing device 1 including a smart NIC 3. The computing device 1 includes a storage controller 2, a smart NIC 3, and an input/output device 4. The computing device 1 can include a plurality of smart NIC 3, and in this embodiment comprises three smart NIC 3. Since the configurations of the three smart NIC 3 are the same, only one smart NIC 3 is shown in FIG. 1.

The storage controller 2 includes a SSD 21 that is a nonvolatile storage device, a controller CPU 22, and a controller DRAM 23 that is a memory. Note that SSD 21 is only described as an exemplary non-volatile storage device, and other non-volatile storage devices such as a hard disk drive may be used. SSD 21, the controller CPU 22, and the controller DRAM 23 are connected to each other by a communication bus (not shown) included in the computing device 1, for example, a PCI express (hereinafter, also referred to as "PCIe"). SSD 21 is one or more non-volatile storage devices. The controller CPU 22 executes programs to be described later.

The controller DRAM 23 stores a session management table 231, a CPU setting list 232, a protocol setting list 233, an IO process program 234, a network setting program 235, and a CHB setting program 236. The session management table 231 stores information of sessions between computing device 1 and the hosts 99. CPU setting list 232 stores the settings of CPU 35 installed in each smart NIC 3. In the protocol setting list 233, a port-by-port communication protocol is set for each smart NIC 3.

IO process program 234, the network setting program 235, and CHB setting program 236 are executed by the controller CPU22. IO core 234 writes data to SSD 21 and reads data from SSD 21 based on an operation command received from the outside via the smart NIC 3. The storage controller 2 receives a PDU (protocol data unit) according to a predetermined communication protocol from a smart NIC 3 and operates based on an operation command included in PDU. The predetermined communication protocol is a communication protocol that is known or developed in the future, and is an iSCSI, Infini Band, NVMe over TCP or the like. PDU may also be referred to as network packets, network frames, communication data, etc.

The network setting program 235 generates a session between the host 99 and computing device 1, and updates the session management table 231. CHB setting program 236 provides a setting window to the operator, and creates or updates CPU setting list 232 and the protocol setting list 233 based on the input of the operator. This setting window will be described later with reference to FIG. 18.

The smart NIC 3 includes a memory, DRAM 31, flash 32, embedded memory 33, ASIC 34, CPU 35, and communication module 36. DRAM 31 are volatile memories. DRAM 31 stores a connection management table 311, a task management table 312, a CPU management table 313, a protocol setting table 314, a CPU setting table 315, a command processing program 316, a conversion program 317, a queue operation program 318, and a network protocol processing program 319.

The flash 32 stores firmware of the smart NIC 3. The embedded memory 33 is a nonvolatile storage device, and stores program data 331 and setting information 332. The program data 331 is expanded in DRAM 31 to become the command processing program 316, the conversion program 317, the queue operation program 318, and the network protocol processing program 319. The setting data 332 is a collection of the connection management table 311, the task management table 312, CPU management table 313, the protocol setting table 314, and CPU setting table 315. Data and programs stored in DRAM 31 will be described later.

ASIC 34 is an application-specific integrated-circuit. ASIC 34 executes processing other than the processing executed by the command processing program 316, the conversion program 317, the queue operation program 318, and the network protocol processing program 319 among the processing to be executed by the smart NIC 3. CPU 35 is a central computing device and has a plurality of computation cores. CPU 35 may be composed of a plurality of physical CPU having one or a plurality of computing cores, or may be composed of one CPU having a plurality of computing cores. In the present embodiment, CPU 35 is described as including eight computing cores, but CPU 35 may include at least one computing core. Hereinafter, the operation core is also referred to as a "core".

The communication module 36 is a physical communication module. The communication module 36 communicates with a host 99 that is external to computing device 1. The communication module 36 includes one or more connecting ports, for example SFP ports. The smart NIC 3 according to the present embodiment has two connecting ports, and will be referred to as "Port 0" and "Port 1" in the following in order to distinguish between the two ports.

The input/output device 4 is a keyboard, a mouse, and a liquid crystal display. The input/output device 4 outputs screen information generated by CHB setting program 236 to a liquid crystal display, and transmits input to a keyboard/mouse by an operator to CHB setting program 236.

Data and programs stored in DRAM 31 will be described. The connection management table 311 stores connection data for each port. In the present embodiment, since the communication module 36 has two ports, there are two connection management tables 311. The task management table 312 stores the state of each task. CPU management table 313 stores an identifier of a connection to be processed and an identifier of a task for each core of CPU 35. The protocol setting table 314 stores a communication protocol used by each port of the communication module 36 to communicate with the host 99. CPU setting table 315 stores CPU 35 settings.

The command processing program 316 is a program that performs processing that can be processed inside the smart NIC 3. The command processing program 316 performs, for example, a process of starting and ending a connection. For example, when the command included in PDU received from the host 99 is the reading of the data stored in SSD 21, PDU is converted into a storage interface command (hereinafter, also referred to as a "storage I/F command") because it cannot be processed by the smart NIC 3, and is transmitted to the storage controller 2. However, when the command is a command that can be processed in the smart NIC 3, the command processing program 316 performs processing without transmitting the command to the storage controller 2.

The conversion program 317 converts a command included in PDU. Specifically, the conversion program 317 rewrites the command included in PDU received from the host 99 into a general-purpose storage interface command that can be processed by the storage controller 2. Further, the conversion program 317 rewrites the command included in the storage interface command received from the storage controller 2 into a command of another communication protocol that can be processed by the host 99 that is the destination of PDU. Furthermore, the conversion program 317 adds and deletes task ID and connection ID to and from PDU.

The queue operation program 318 performs data transfer between a virtual queue and a real queue, which will be described later, and the like. Details of the queue operation program 318 will be described later. The network protocol processing program 319 converts a communication protocol in PDU. In other words, the conversion program 317 converts the communication protocol into the storage interface command by rewriting PDU.

FIG. 2 is a diagram showing an example of the session management table 231, the CPU setting list 232, and the protocol setting list 233 stored in the controller DRAM 23 of the storage controller 2. The session management table 231 stores data of each session. Specifically, it includes session ID, protocol setting information, network setting information, and LUN mapping information. The session ID is an identifier of the session, and is represented by a combination of "E" and a number in the present embodiment. The protocol setting information is setting data related to a communication protocol to be used. In FIG. 2, "ISCSI setting" is used for the sake of simplicity of description, but in practice, specific setting data is stored. The network setting information is setting data related to the network. In FIG. 2, "TCP setting, IP setting" is used for the sake of simplicity of description, but in practice, specific setting data is stored. LUN mapping information is an identifier of a logical unit number to be used.

CPU setting list 232 stores the settings of CPU 35 installed in each smart NIC 3. Specifically, it includes a CHB ID, a queue operation-dedicated mode, a queue operation-shared mode, a port 0 CPU resource, and a port 1 CPU resource. CHB ID is an identifier of a channel board, i.e., a smart NIC 3, and is represented by a combination of "C" and a number in this embodiment.

The queue operation-dedicated mode and the queue operation-shared mode are settings for operating CPU 35 in either the queue operation-dedicated mode or the queue operation-shared mode. The queue operation-dedicated mode and the queue operation-shared mode have front and back relationships, and one is set to "Yes" and the other is set to "No". The port 0 CPU resource and the port 1 CPU resource are settings for allocating resource of CPU 35. The sum of the port 0 CPU resource and the port 1 CPU resource is 100% or less.

In the protocol setting list 233, a port-by-port communication protocol is set for each smart NIC 3. Specifically, whether or not CHB ID can be applied is described for each protocol-specific and port-specific. In the embodiment shown in FIG. 2, it is described that in the smart NIC 3 where CHB ID is "C1", the port 0 corresponds only to "iSCSI Target", and the port 1 corresponds only to "NVMe over TCP". The protocol that each port can support is not limited to one. For example, a smart NIC 3 having a CHB ID of "C3" corresponds to both "iSCSI Target" and "NVMe over TCP" in the port 1.

FIG. 3 is a diagram showing an example of the connection management table 311, a task management table 312, and a CPU management table 313 stored in a DRAM 31 of a smart NIC 3 whose CHB ID is "C1". The connection management table 311 stores connection data for each port. FIG. 3 illustrates an example of the connection management table 311 of the port 0. That is, although not shown in FIG. 3, a connection management table 311 in which a connection generated using the port 1 is described is also separately present.

Specifically, the connection management table 311 stores a connection ID, a core number, connection information, and task ID. The connection ID is an identifier for identifying a connection, and is represented by a combination of "N" and a number in the present embodiment. The task ID is generated each time an IO is received from the host 99. Since it is common to receive a plurality of PDU in one connection, the connection ID and the task ID are in a 1: many relation.

The core number is an identifier of a core constituting CPU 35, and is represented by a combination of "R" and a number in the present embodiment. The connection information is various data related to the connection. In FIG. 3, "Connection setting" is used for the sake of simplicity of description, but in practice, data of a specific connection is stored. The task ID is a list of identifiers of tasks associated with the corresponding connection, and is represented by a combination of "T" and a number in the present embodiment. Although the task ID is described as a hexadecimal number in FIG. 3, it may be expressed as a decimal number or the like.

The task management table 312 stores the state of each task. Specifically, PDU 1 and PDU 2 are stored for each task ID. CPU management table 313 stores an identifier of a connection to be processed and an identifier of a task for each core of CPU 35. The relationship between the core number and the connection ID and the relationship between the connection ID and the task ID are described in the connection management table 311. Therefore, CPU management table 313 can be created based on all the connection management tables 311 of one smart NIC 3.

FIG. 4 is a diagram showing an example of the protocol setting table 314 and the CPU setting table 315 stored in a DRAM 31 of a smart NIC 3 whose CHB ID is "C1". The protocol setting table 314 stores a communication protocol used by each port of the communication module 36 to communicate with the host 99. Since the storage controller 2 sends an operation command at the time of initialization of the smart NIC 3 based on the protocol setting list 233, the protocol setting table 314 of the smart NIC 3 stores the corresponding CHB ID of the protocol setting list 233 as it is. Specifically, in the protocol setting list 233 shown in FIG. 2, "iSCSI Target" is set for the port 0 whose CHB ID is "C1", and "NVMe over TCP" is set for the port 1. In the protocol setting table 314 of FIG. 4, the same CHB ID as "C1" in the protocol setting list 233 is stored.

CPU setting table 315 stores CPU 35 settings. Since the storage controller 2 sends an operation command at the time of initialization of the smart NIC 3 based on CPU setting list 232, CPU setting table 315 of the smart NIC 3 contains the corresponding CHB ID of the 232 as it is. Specifically, CPU setting table 315 of FIG. 4 directly describes CHB ID "C1" in CPU setting list 232 shown in FIG. 2.

Figure 5:
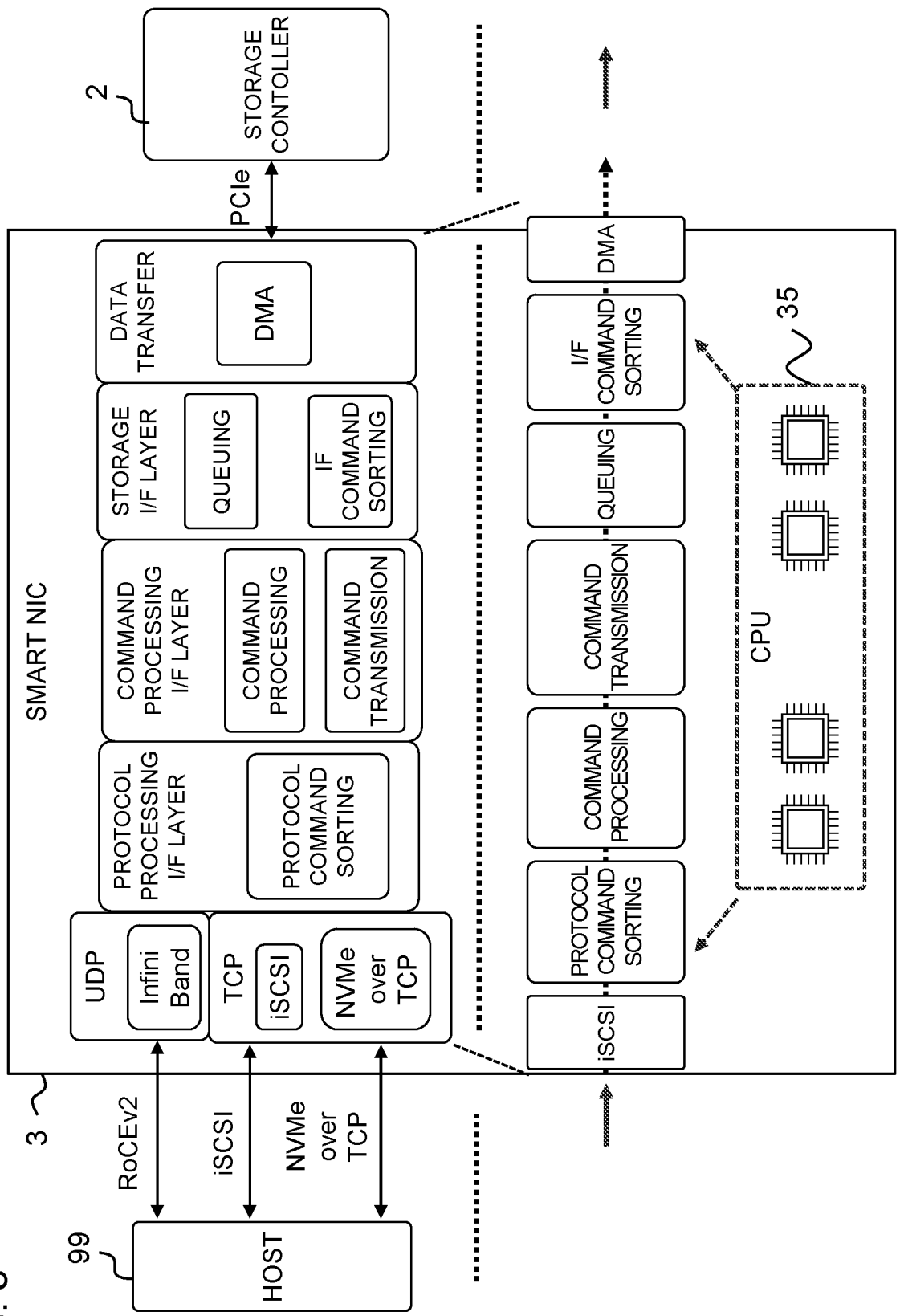
FIG. 5 is a diagram illustrating an outline of a process executed by the smart NIC.

FIG. 5 is a diagram illustrating an outline of a process executed by the smart NIC 3. The smart NIC 3 relays bi-directional communication between the host 99 and the storage controller 2. However, FIG. 5 illustrates a state in which communication from the host 99 to the storage controller 2 is relayed. For communication between the host 99 and the smart NIC 3, various communication protocols such as RoCEv2, iSCSI, NVMe over TCP are used. A PCIe is used for communication between the smart NIC 3 and the storage controller 2. The smart NIC 3 supports various communication protocols with the host 9 through software processes.

Upon receiving the communication from the host 99, the smart NIC 3 first performs a protocol-analysis, e.g., a PDU header-analysis. Next, the smart NIC 3 performs command-sorting. Specifically, the smart NIC 3 first determines whether or not it is necessary to send data to the storage controller 2. The Smart NIC 3 process and sends result of the process to Host9 if the Smart NIC 3 can process it. The Smart NIC 3 continues to process if it needs to send to storage controller 2. The smart NIC 3 then converts PDU to a storage interface command. Specifically, the received PDU headers are rewritten so that the storage controller 2 can interpret them, and PDU payload is also processed as needed. The smart NIC 3 then queues the storage interface commands for transmission to the storage controller 2. The processing of the queue will be described later.

Next, the smart NIC 3 performs interface command distribution. Finally, the smart NIC 3 forwards the storage interface command to the controller DRAM 23 of the storage controller 2 by DMA. When the communication from the storage controller 2 to the host 99 is relayed, the flow is opposite to that of FIG. 5.

FIG. 6 is a diagram showing an example of the allocation of CPU cores in the communication module 36. The assignment of CPU in the communication module 36 in the smart NIC 3 is determined based on the description of CPU setting table 315 when the smart NIC 3 is initialized, for example, when the power is turned on. However, at the time of initialization of the smart NIC 3, CPU setting of the corresponding smart NIC 3 may be copied from CPU setting list 232 of the storage controller 2 to CPU setting table 315.

In the example shown in the upper part of FIG. 6, all eight cores included in the smart NIC 3 are assigned to port 0. In this case, the command received from the host 99-1 connected to port 0 is processed, but the command received from the host 99-2 connected to port 1 is not processed. In the case shown in the lower part of FIG. 6, the eight cores included in the smart NIC 3 are equally allocated to the port 0 and the port 1. In this case, the command received from the host 99-1 and the command received from the host 99-2 are processed at the same ratio. This configuration corresponds to CPU setting table 315 shown in FIG. 4.

Figure 7:
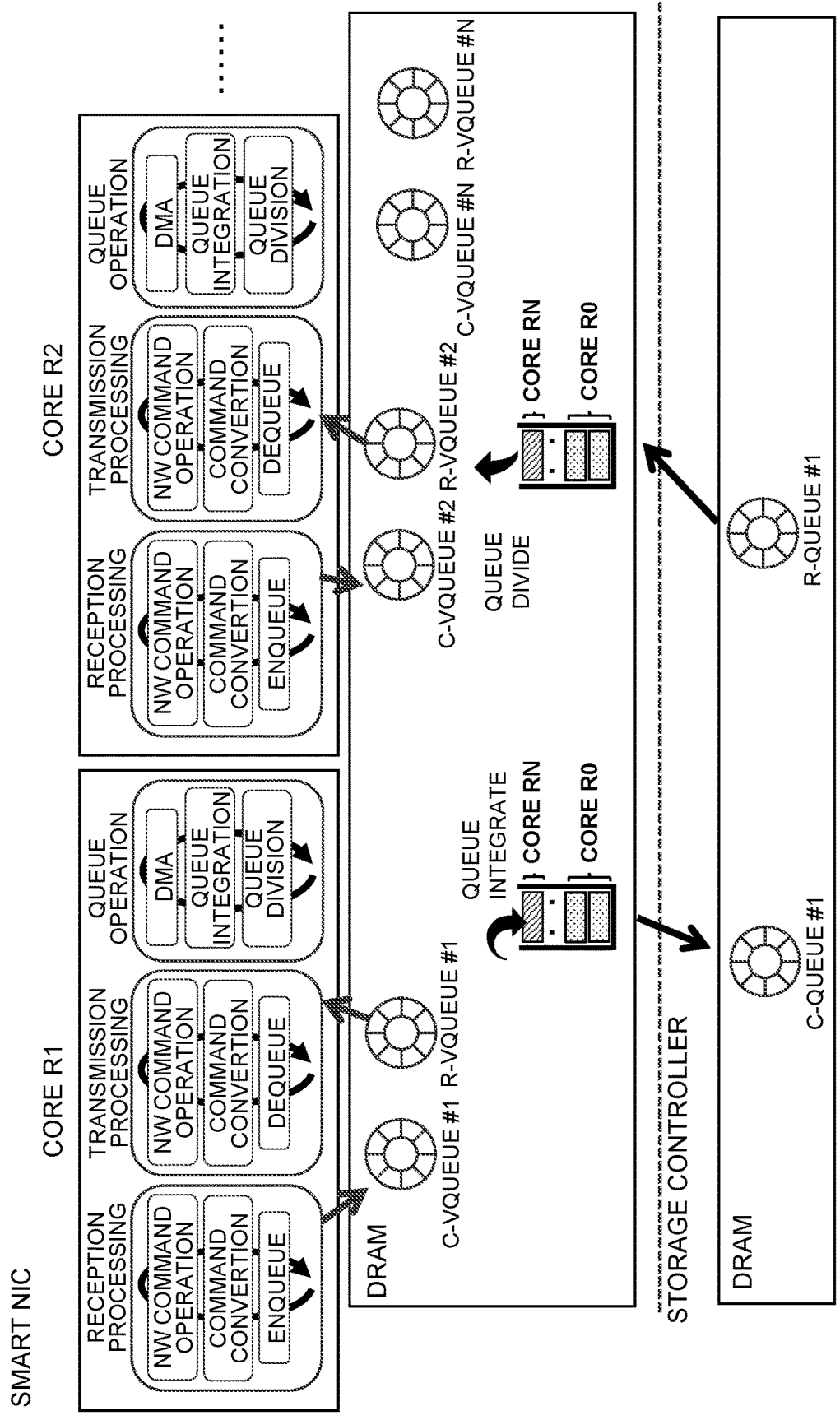
FIG. 7 is a schematic diagram illustrating processes performed by respective cores of the smart NIC.

FIG. 7 is a schematic diagram illustrating processes performed by respective cores of the smart NIC 3. However, this figure shows the operation in the queue operation-shared mode. The storage controller 2 has one command-receiving queue (C-queue) and one response queue (R-queue). The command receiving queue is a queue that stores commands from the host 99. The response queue is a queue for storing a response command to the host 99. Hereinafter, the command reception queue and the response queue are also referred to as "real queues".

Each core of CPU 35 includes a virtual command receiving queue and a virtual response queue. The virtual command receiving queue and the virtual response queue are realized by an area reserved in DRAM 31 of the smart NIC 3. The virtual command receiving queue and the virtual response queue are, for example, ring buffers. Hereinafter, the virtual command receiving queue and the virtual response queue are also referred to as "virtual queues". That is, there is only one real queue, but the number of virtual queues is as many as the number of cores, so that it is necessary to integrate or divide the queues. The reason why the real queue and the virtual queue are divided is to absorb this difference in the present configuration in which the number of queues of the storage controller 2 differs from the number of cores of CPU 35 of the smart NIC 3.

Each core of CPU 35 performs a reception process, a transmission process, and a queuing process. The reception process is a process of storing in a queue, specifically a virtual command reception queue, among the processes described with reference to FIG. 5 in the relay of communication from the host 99 to the storage controller 2. The transmission process is a process after the process of acquiring the storage interface command from the virtual response queue in the relay of the communication from the storage controller 2 to the host 99. The queuing process includes these two process. One process is retrieving the storage interface commands from the virtual command receiving queues of all cores and transmit them to the real queue of the storage controller 2 by the integrated DMA transfer. And the other process is separate the storage interface commands acquired from the real queue of the storage controller 2 by DMA transfer and store them in the respective virtual response queues.

In the smart NIC 3, the same connection is handled by the same core. The purpose of this is to save resource, to avoid management complexity, and to avoid performance degradation due to contention exclusion waiting between cores. For example, when the core R3 receives a data request from a certain host 99, the core R3 transmits the data acquired from the storage controller 2 that is the response.

FIG. 8 is a diagram for explaining the queue operation-dedicated mode and the queue operation-shared mode. Here, as shown in the lower part of FIG. 4, it is assumed that CPU resource allocation for each port is 50%. The upper part of FIG. 8 shows the queue operation-dedicated mode, and the lower part of FIG. 8 shows the queue operation-shared mode. The difference between the queue operation-dedicated mode and the queue operation-shared mode is whether or not a role is shared by the cores.

In the queue operation-dedicated mode illustrated in the upper part of FIG. 8, dedicated cores for performing queue operations are set for each port. In the present embodiment, since the communication module 36 has two ports, port 0 and port 1, two cores are engaged in the queue operation only. Therefore, in this case, the remaining six cores have a virtual queue and perform reception processing and transmission processing. When one port is noticed, one core performs only a queue operation, and three cores perform reception processing and transmission processing.

In the queue operation-shared mode shown in the lower part of FIG. 8, all cores perform queue operation, reception processing, and transmission processing. In this case, which core performs the queue operation is undefined. For example, a command from a host 99 having the same core may perform all of the queue operation, the reception processing, and the transmission processing. In this case, four cores per port perform the queue operation, the reception process, and the transmission process.

Hereinafter, an computing core that performs reception processing and transmission processing is referred to as an "IO core", and an computing core that performs queue operation is referred to as a "queue core". In the queue operation-dedicated mode, IO core and the queue core are fixed, while in the queue operation-shared mode, IO core and the queue core are fluid. That is, in the queue operation-shared mode, one core operates as an IO core at a certain timing, but operates as a queue core at another timing. The same number of virtual queues as IO cores are prepared, and in the queue operation-dedicated mode, the virtual queues shown below are prepared by subtracting the number of queue cores from the number of computing cores included in CPU 35. In the queue operation-shared mode, the number of IO cores differs depending on the timing. However, since any core can be an IO core, the same number of virtual queues as the number of computing cores included in CPU 35 are prepared.

There is no obvious superiority or inferiority between the queue operation-dedicated mode and the queue operation-shared mode, and each has advantages and disadvantages. The advantage of the queue operation-dedicated mode is that, since the core that performs the queue operation is fixed, the exclusive processing between the cores for operating the queue becomes unnecessary, and there is no overhead of the exclusive processing. On the other hand, there is a disadvantage that the number of cores to be subjected to IO process is reduced. The advantage of the queue operation-shared mode is that the number of cores for IO process can be increased. A disadvantage of the queue operation-shared mode is that exclusive processing between cores for operating the queue is required.

Figure 9:
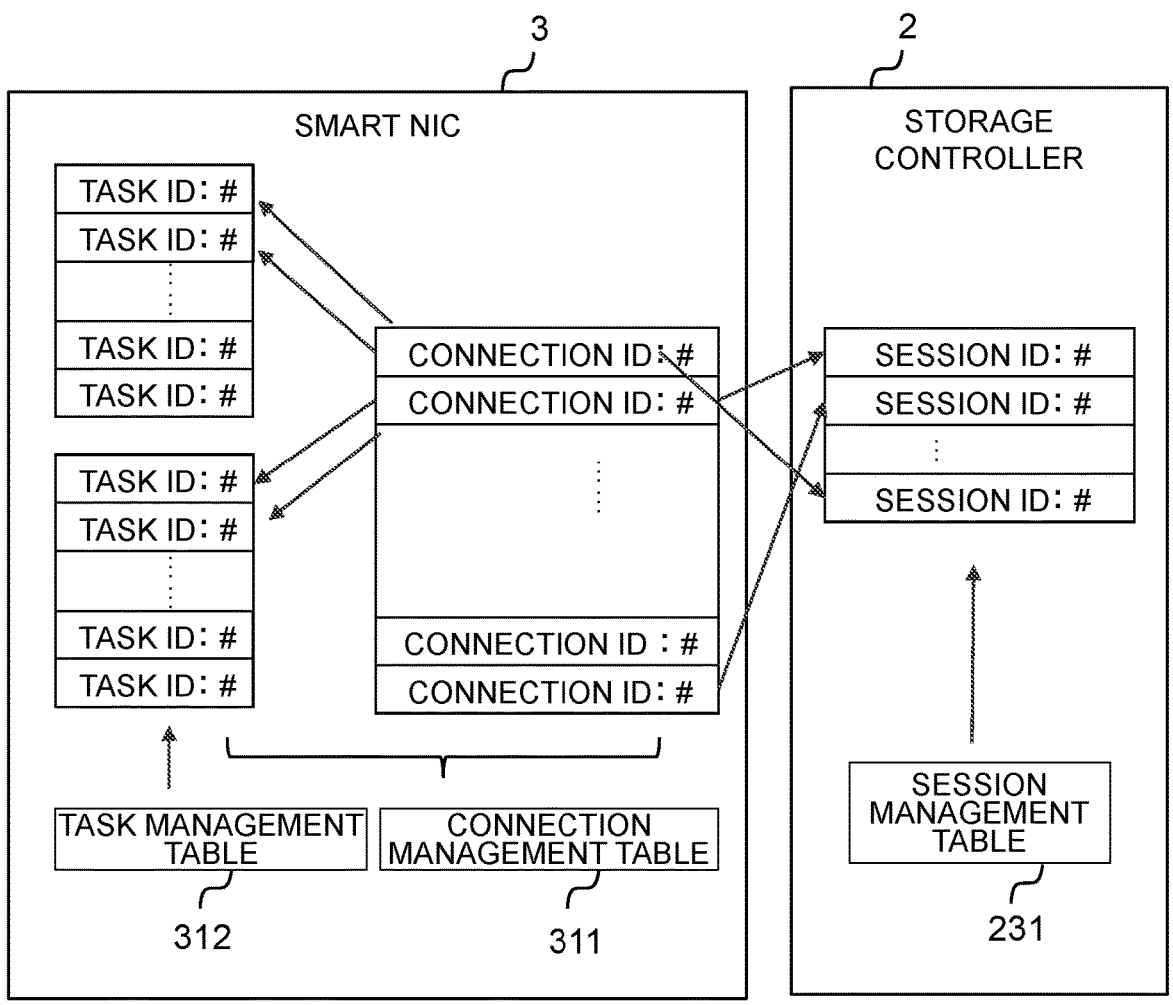
FIG. 9 is a diagram illustrating a relationship among the session management table, the connection management table, and the task management table.

FIG. 9 is a diagram illustrating a relationship among the session management table 231, the connection management table 311, and the task management table 312. The session management table 231 is stored in the storage controller 2. The connection management table 311 and the task management table 312 are stored in the smart NIC 3. The session management table 231 stores information for each session. The connection management table 311 stores one or more task ID associated with each session ID and information for each connection. The task management table 312 stores information for each task. The correspondence between the session ID and the connection ID can be specified from the correspondence between the network setting information associated with the session ID and the connection information associated with the connection ID.

Figure 10:
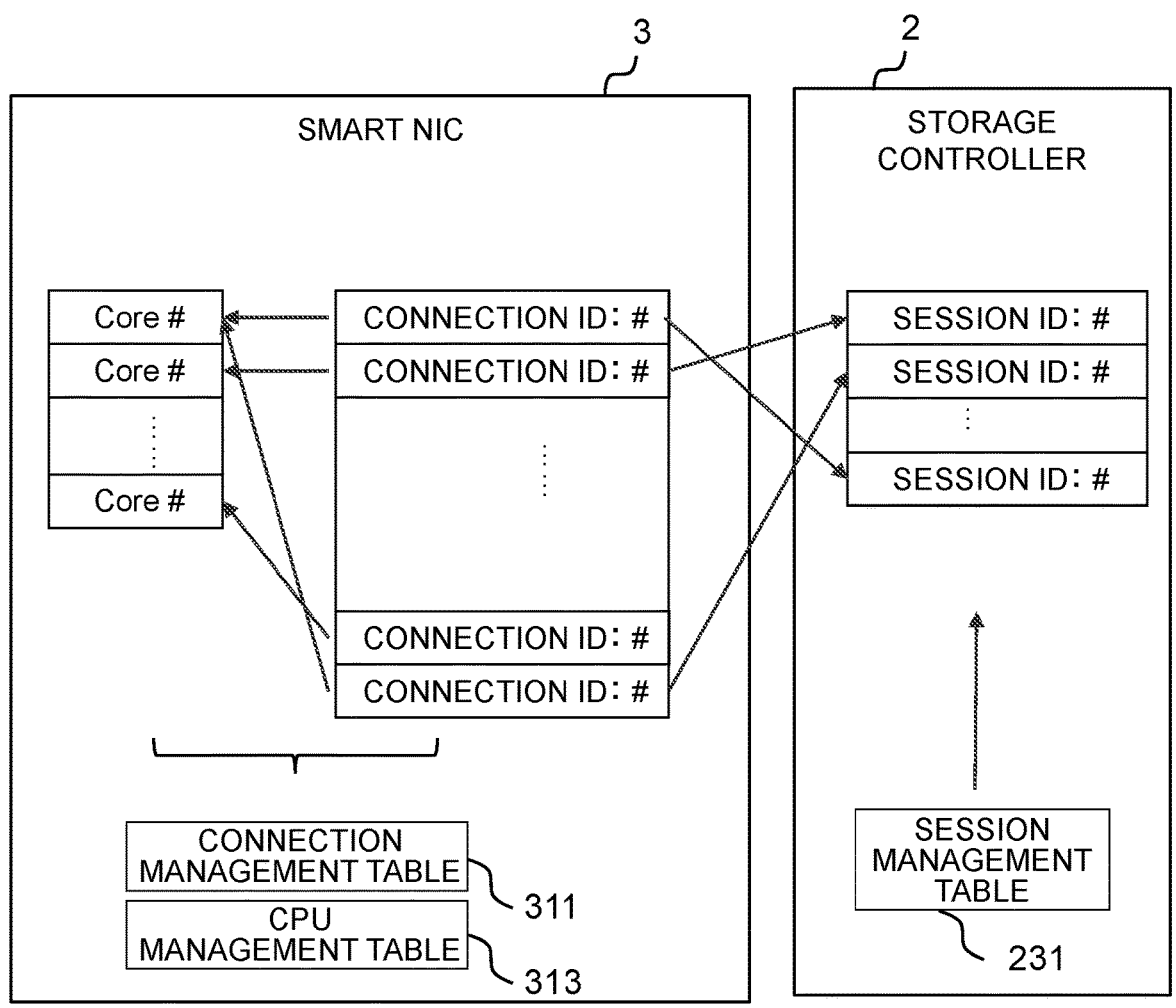
FIG. 10 is a diagram illustrating a relation among the session management table, the connection management table, and CPU management table.

FIG. 10 is a diagram illustrating a relation among the session management table 231, the connection management table 311, and CPU management table 313. The session management table 231 is stored in the storage controller 2, and the connection management table 311 and CPU management table 313 are stored in the smart NIC 3. The correspondence between the connection ID and the core number can be specified from each of the connection management table 311 and CPU management table 313.

Figure 11:
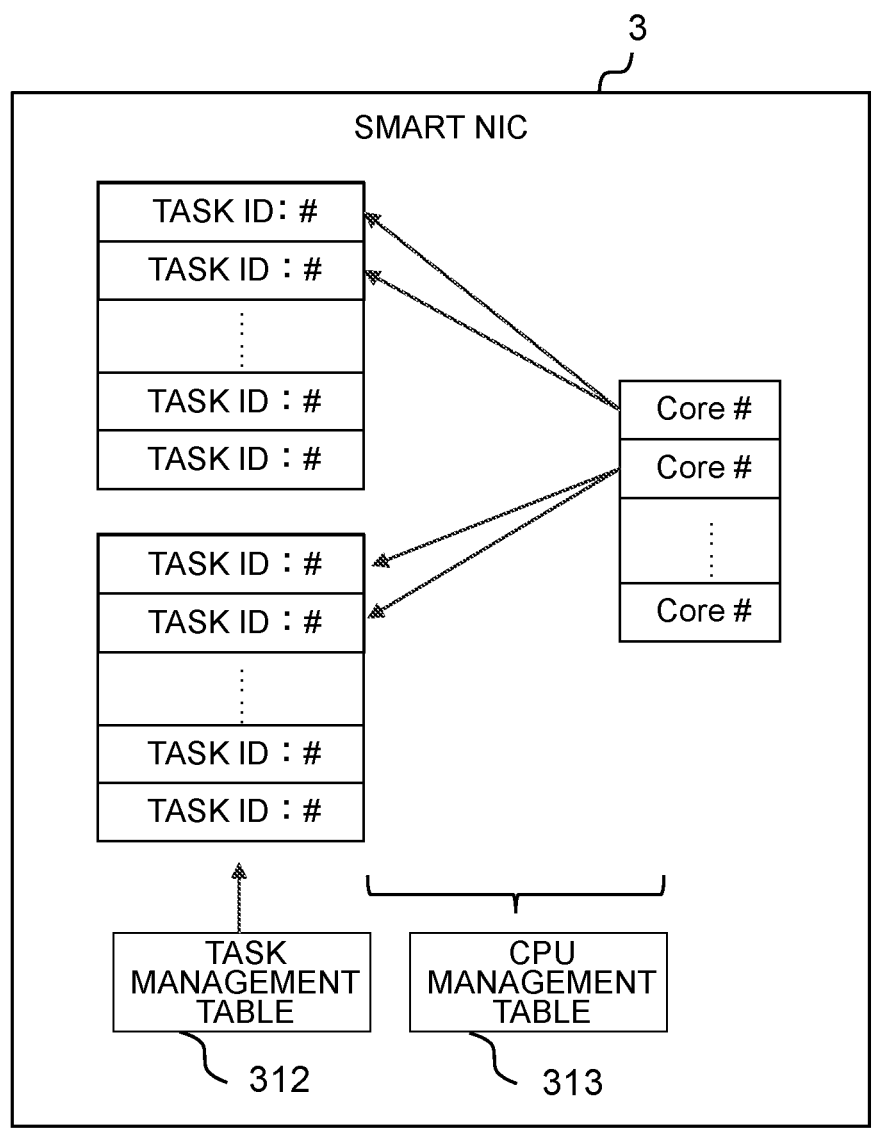
FIG. 11 is a diagram illustrating a relation between the task management table and CPU management table.

FIG. 11 is a diagram illustrating a relation between the task management table 312 and CPU management table 313. The task management table 312 stores information for each task ID. CPU management table 313 stores information of one or more task ID corresponding to the core number.

Figure 12:
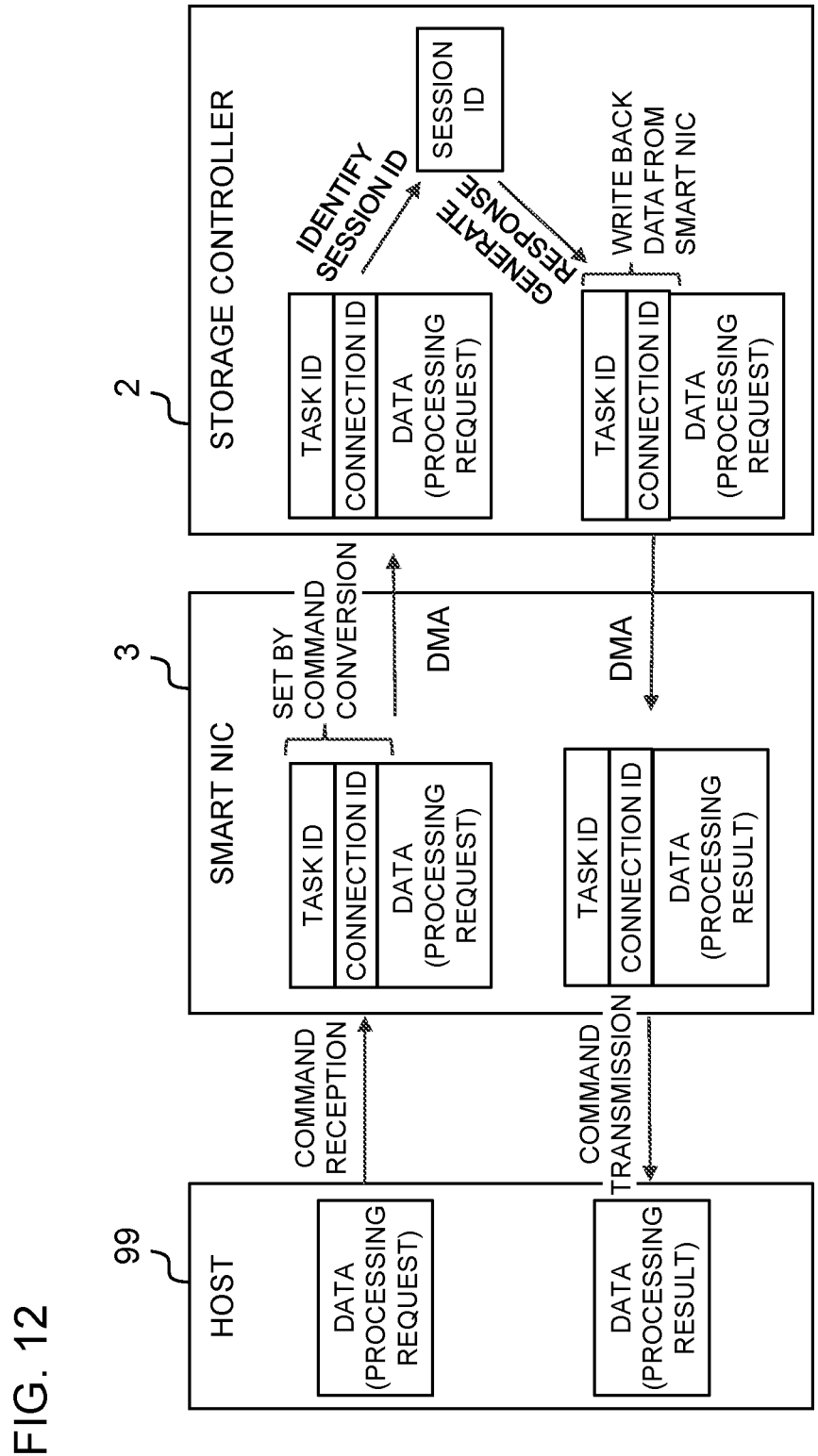
FIG. 12 is a schematic diagram illustrating a process performed by computing device.

FIG. 12 is a schematic diagram illustrating a process performed by computing device 1. First, when the host 99 transmits processing request data, which is data requesting processing, to computing device 1, the smart NIC 3, which is the network interface of computing device 1, receives the data. Then, the smart NIC 3 adds the task ID and the connection ID to the storage interface command by the command conversion process by the conversion program 317 and DMA transfers them to the storage controller 2.

The storage controller 2 refers to the session management table 231 to identify the session ID, and performs processing based on the processing request to obtain a processing result. This processing is, for example, reading of designated data from SSD 21, and the processing is data read from SSD 21. The storage controller 2 writes back the task ID and the connection ID that have been added to the data received from the smart NIC 3, and copies them to the smart device via DMA transfers. The smart NIC 3 performs the command-conversion again and transmits the process result to the host 99.

Figure 13:
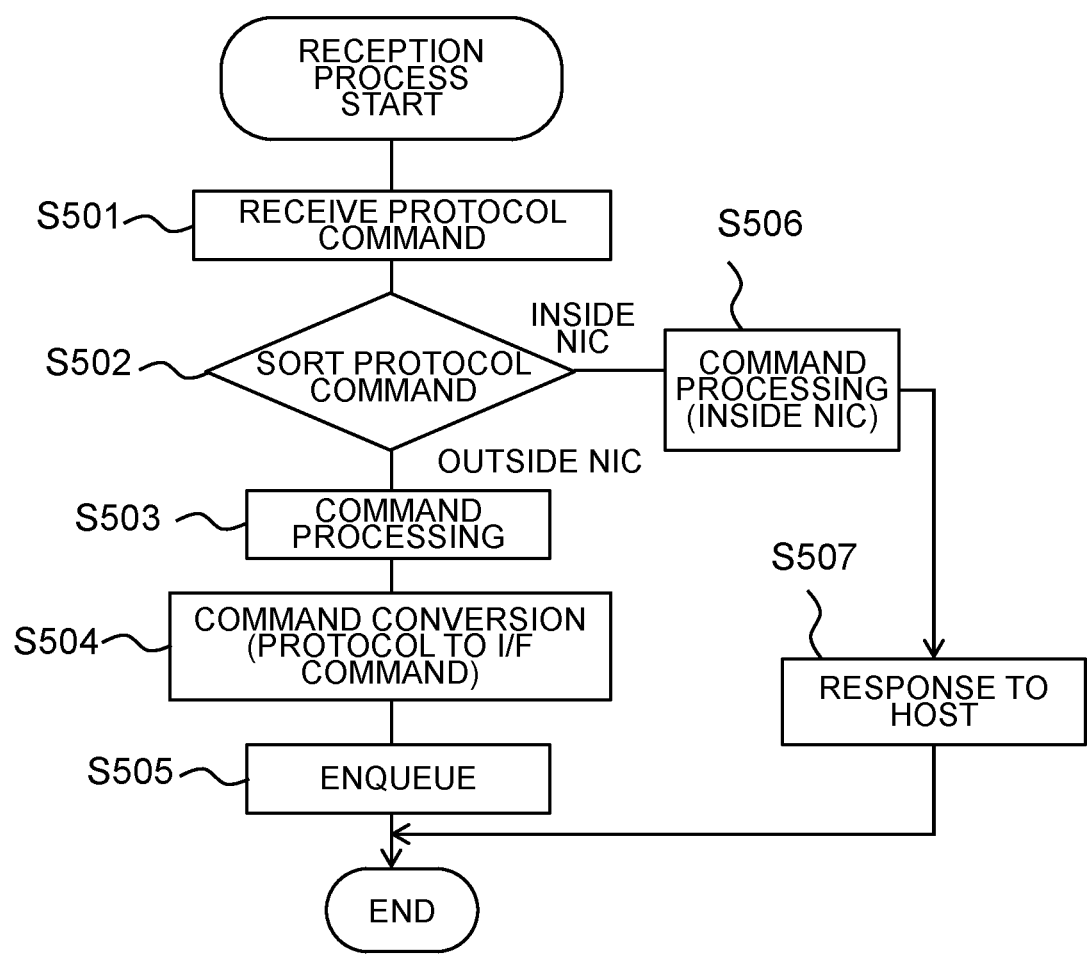
FIG. 13 is a flow chart illustrating a reception process by CPU.

FIG. 13 is a flow chart illustrating a reception process by CPU 35. The processing of this flowchart is generally executed by the conversion program 317. In a step S501, the conversion program 317 receives protocol commands from the host 99. In the subsequent step S502, the conversion program 317 sorts the protocol commands. When the conversion program 317 determine that the processing can be performed inside the smart NIC 3, the conversion program 317 proceeds to the step S506. When the conversion program 317 determines that the processing of the storage controller 2 is required, the conversion program 317 proceeds to the step S503. In the step S503, the command processing program 316 performs command processing. In the subsequent step S504, the conversion program 317 performs command conversion, and converts the communication protocol used by the host 99 into an interface command interpretable by the storage controller 2.

In the following step S505, the conversion program 317 adds the generated message to the virtual queue, and ends the process illustrated in FIG. 13. The virtual queue to be added at this time is a virtual queue of CPU core executing the process illustrated in FIG. 13. In the step S506, the command processing program 316 performs command processing in the smart NIC 3. In the subsequent step S507, the conversion program 317 responds to the host 99 by using the result in the step S506, and ends the process illustrated in FIG. 13.

Figure 14:
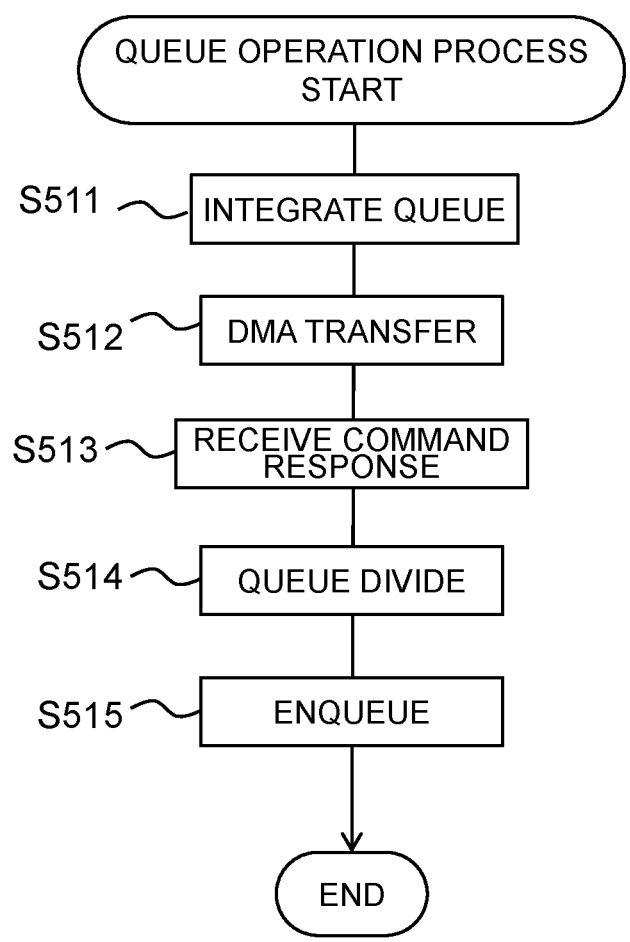
FIG. 14 is a flow chart illustrating a queue operation process performed by CPU.

FIG. 14 is a flow chart illustrating a queue operation process performed by CPU 35. In the step S511, the queue operation program 318 integrates queues, i.e., integrates messages stored in the virtual queues of the respective CPU cores. In the subsequent step S512, the queue operation program 318 transfers the storage interface command integrated in the step S511 to the storage controller 2 by DMA transfer. In response to a request from the storage controller 2, the process performed by the storage controller 2 is transferred from the storage controller 2 to the smart NIC 3 by DMA transfer.

In the subsequent step S513, the queue operation program 318 receives a command reply, and in the subsequent step S514, the queue operation program 318 separates the queue. In the following step S515, the queue operation program 318 adds the separated queue to the virtual response queue of the appropriate core, and ends the process illustrated in FIG. 14. Here, an appropriate method of selecting the core is as follows. As shown in FIG. 12, connection ID and task ID are added to the storage interface command received from the storage controller 2. Therefore, the queue operation program 318 refers to the connection management table 311 or CPU management table 313 to identify the core number to which PDU obtained by converting the storage interface command should be transmitted. As described above, since the virtual queue is prepared for each core of CPU 35 and the correspondence between the core and the virtual queue is known, the queue operation program 318 adds the storage interface command to the virtual queue corresponding to the identified core number.

Figure 15:
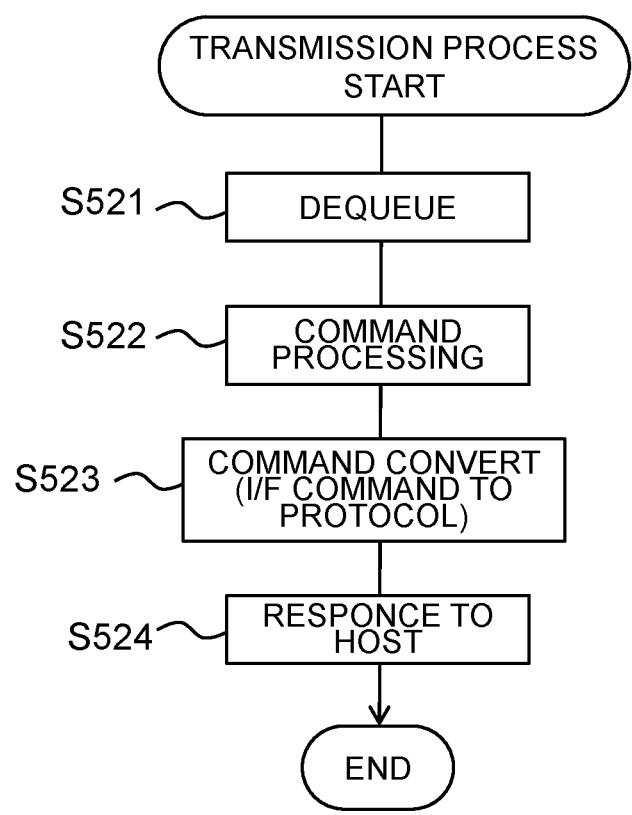
FIG. 15 is a flow chart illustrating a transmission process by CPU.

FIG. 15 is a flow chart illustrating a transmission process by CPU 35. In a step S521, the conversion program 317 retrieves one storage interface command from the corresponding virtual response queue. In the subsequent step S522, the conversion program 317 performs a command process on the extracted storage interface command, and in the subsequent step S523, converts the interface command into a PDU of a communication protocol used by the host 99. In the subsequent step S524, the conversion program 317 responds to the host 99 by using the processing of the step S523, and ends the processing illustrated in FIG. 15.

Figure 16:
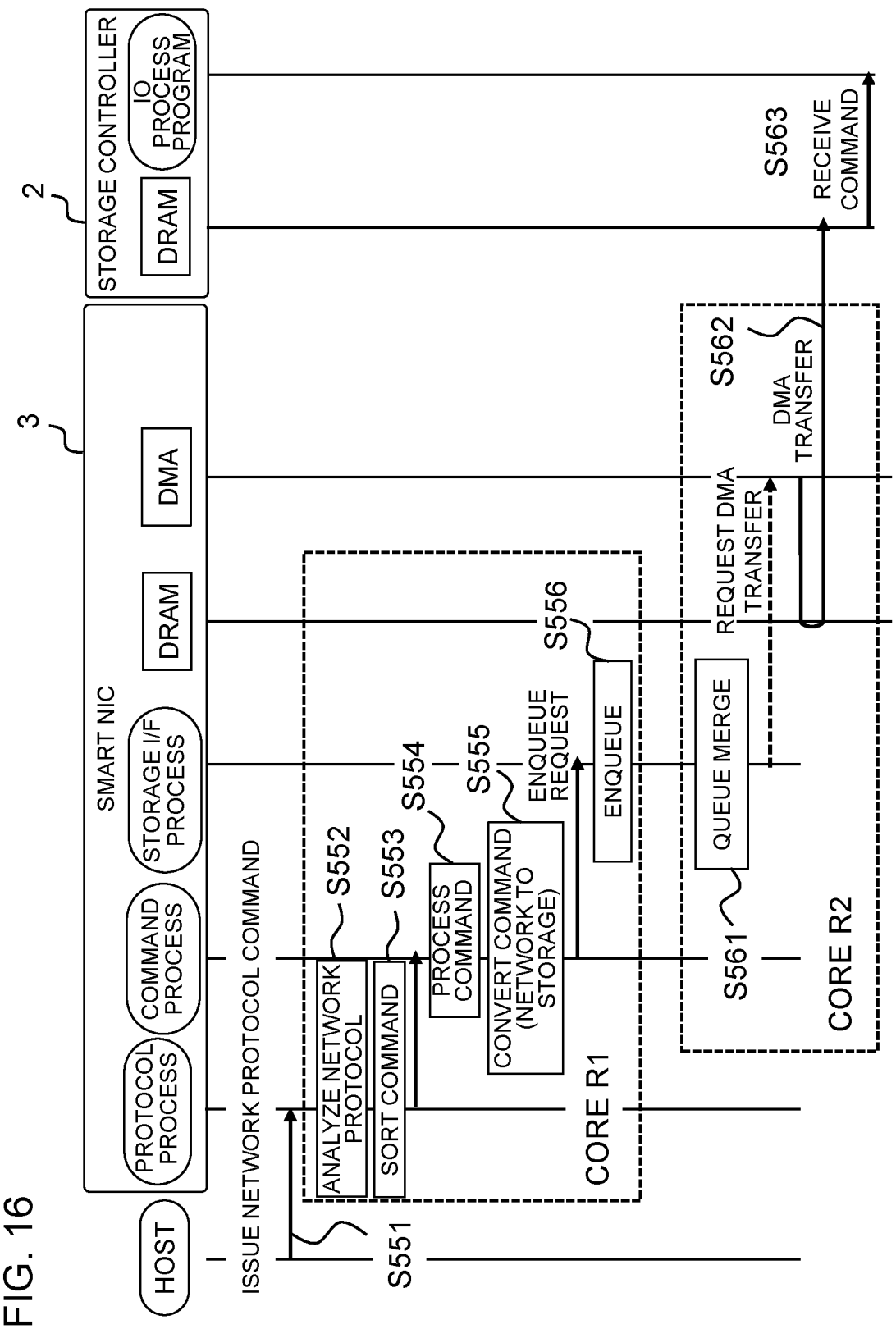
FIG. 16 is a time chart illustrating the process of computing device.
Figure 17:
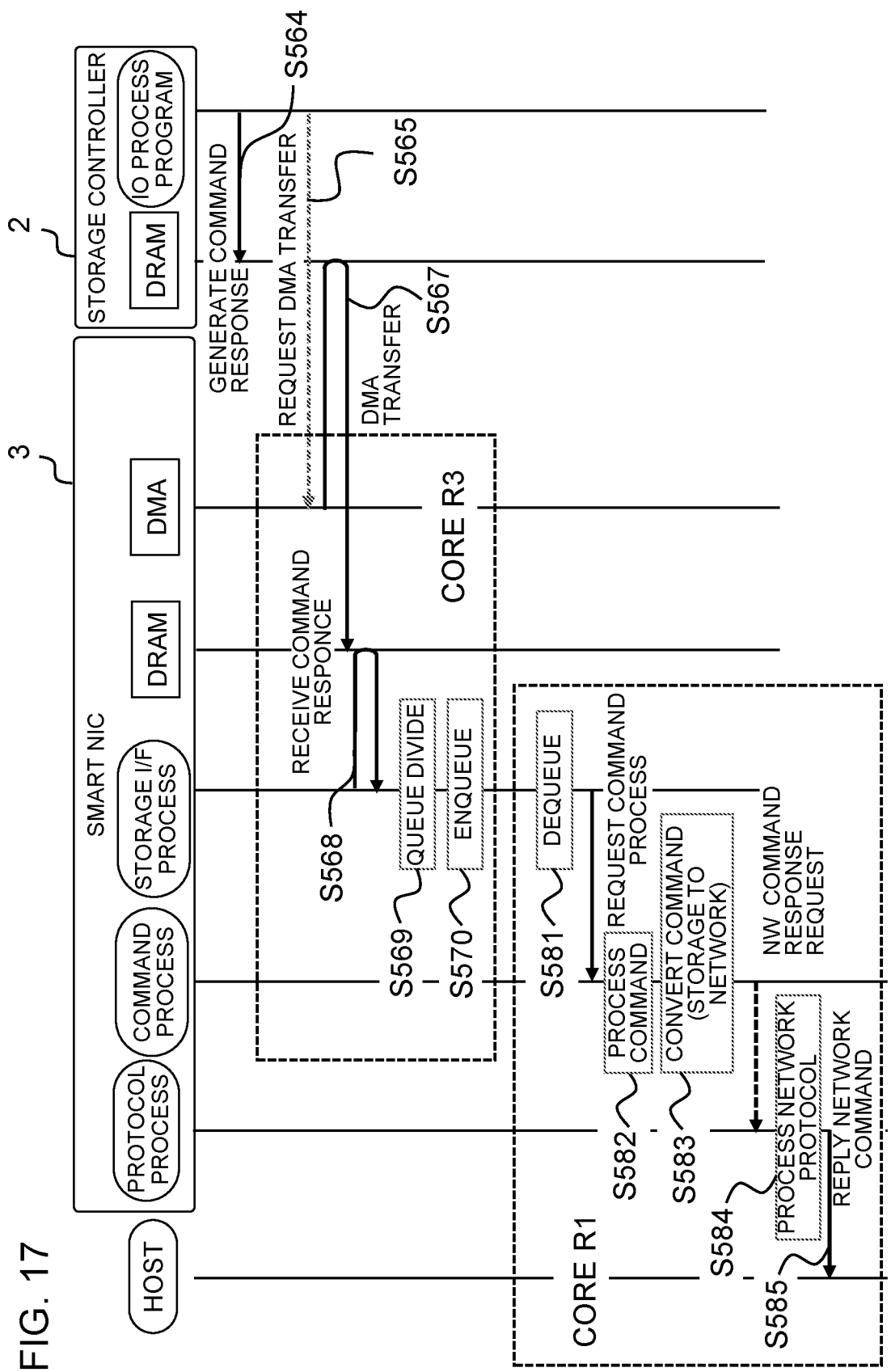
FIG. 17 is a time chart illustrating the process of computing device.

FIG. 16 and FIG. 17 are time charts illustrating the process of computing device 1. However, FIG. 16 and FIG. 17 show a series of processes of computing device 1 responding to a request from the host 99, and there is continuity. Specifically, the reply to S551 which is the first process in FIG. 16 is S585 shown at the end of FIG. 17. This time chart is intended to be an example of a CPU 35 to be processed.

First, the host 99 issues a network protocol command to the smart NIC 3 (S551). The core R1 of the smart NIC 3 that has received this performs network protocol analysis (S552) and command distribution (S553), which are protocol processes. Next, command processing (S554) and command transformation (S555) are performed as command processing in a broad sense. CPU 35 also input the result of command convert into the virtual queues (S556). S552 to S556 is performed by the same core, e.g., a core R1.

Next, CPU 35 retrieves commands from the plurality of virtual queues, integrates them (S561), and transfers the integrated commands to the storage controller 2 by DMA transfer (S562). The transferred commands are inputted to the real queue of the storage controller 2, and IO process program 234 sequentially receives the commands (S563). S561 to S562 is performed by the same core, e.g., a core R2. However, S561 to S562 may be executed by the same core as S552 to S556 or may be executed by a different core.

The description will be continued with reference to FIG. 17. When IO process program 234 creates a command-response (S564), it requests the smart NIC 3 to forward DMA transfer (S565). CPU 35 of the smart NIC 3 that has received the request performs DMA transfer, copies the storage interface command from the storage controller 2 to DRAM 31 (S567), and receives the command response (S568). Then, the queue is separated (S569), and the separated queue is added to an appropriate virtual response queue by referring to the connection management table 311 or CPU management table 313 (S570). S567 to S570 is performed by the same core, e.g., a core R3. However, S567 to S570 may be executed by the same core as S552 to S556 or S561 to S562, or may be executed by a different core.

The core of CPU 35 that has executed S552 to S556 in FIG. 17, for example, the core R1, extracts dequeue (S581), that is, the storage interface command from the virtual response queue of the core R3 (S582). Then, the core R1 converts the storage interface command according to the network protocol of the host 99 (S583), performs the network protocol process (S584), and transmits a reply to the host 99 (S585). This S581 to S585 is executed by the same core as S552 to S556.

FIG. 18 is a diagram showing an example of the setting window generated by CHB setting program 236. The setting window may be displayed on the input/output device 4 of computing device 1, or may be displayed on another device via networked communication. A protocol setting window 910 is shown at the top of FIG. 18, and a CPU setting windows 920 is shown at the bottom of FIG. 18. The protocol setting window 910 and CPU setting windows 920 may be simultaneously displayed as shown in FIG. 18, or may be separately displayed.

The protocol setting window 910 includes a CHB selection button 911, a port 0 setting button 912, and a port 1 setting button 913. The operator changes the channel board to be set by using CHB selection button 911. The operator sets a communication protocol corresponding to the port 0 by using the port 0 setting button 912. The operator sets a communication protocol corresponding to the port 1 by using the port 1 setting button 913. The operation result of the operator on the protocol setting window 910 is reflected in the protocol setting list 233. In the example illustrated in FIG. 18, since the port 0 setting button 912 and the port 1 setting button 913 are pull-down menus, only one item can be selected, but two or more items may be selectable.

CPU setting window 920 includes a CHB selection button 921, a mode setting button 922, a port 0 ratio setting button 923, and a port 1 ratio setting button 924. The operator changes the channel board to be set by using CHB selection button 921. The operator uses the mode setting button 922 to set either the queue operation-dedicated mode or the queue operation-shared mode. The operator uses the port 0 ratio setting button 923 to set the ratio of CPU 35 used for the port 0. The operator uses the port 1 ratio setting button 924 to set the ratio of CPU 35 used for the port 1. The operator operates the protocol setting window 910 to be reflected in CPU setting list 232.

According to the above-described first embodiment, the following effects can be obtained. (1) The smart NIC 3, which may also be referred to as an interface module, is connected to the storage controller 2 and relays communication between the host 99 and the storage controller 2. The host 99 and the storage controller 2 use different communication protocols. The smart NIC 3 includes a plurality of computing cores and a DRAM 31. At least one of the plurality of computing cores is an IO core in communication with the host 99. Each of IO core has a virtual queue in DRAM 31. IO core executes a reception process of converting the communication protocol of PDU outputted by the host 99 and storing it in the virtual queue, and a transmission process of extracting the storage interface command from the virtual queue, converting the communication protocol, and transmitting it to the host 99, and in the same session, the same IO core executes the reception process and the transmission process. Therefore, it is possible to easily cope with a new communication protocol.

(2) The computing core performs a queue operation in which the storage interface commands stored in the respective virtual queues are integrated and transferred to the storage controller 2 by the reception processing, and the storage interface commands acquired from the storage controller 2 are separated and stored in the respective virtual queues.

(3) The smart NIC 3 includes a plurality of external communication ports capable of communicating with the host 99. In the present embodiment, the communication module 36 includes two communication ports, a port 0 and a port 1. According to CPU setting table 315, the number of computing cores can be set in advance for each external communication port.

(4) In the queue operation-shared mode, each of the computing cores is set to be executable in both the reception process, the transmission process, and the queue operation. Therefore, the number of cores to be subjected to IO process can be increased.

(5) In the queue operation-dedicated mode, IO core that is a part of the computing core performs the reception process and the transmission process, but does not perform the queue operation, and the queue core that is another part of the computing core performs the queue operation but does not perform the reception process and the transmission process. This eliminates the need for inter-core exclusion processing for manipulating the queue and eliminates the overhead of this exclusion processing.

(Modification 1)

In the above-described embodiment, only one real queue is provided in the storage controller 2. However, the storage controller 2 may include two or more real queues.

In the above-described embodiments and modifications, the configuration of the functional blocks is merely an example. Several functional configurations shown as separate functional blocks may be integrally configured, or a configuration represented by one functional block diagram may be divided into two or more functions. In addition, some of the functions of the functional blocks may be included in other functional blocks.

In the above-described embodiments and modifications, computing device 1 may include an input/output interface (not shown) and may read programs from other devices via a medium that can be used by the input/output interface and computing device 1 when needed. Here, the medium refers to, for example, a storage medium that is detachable from the input/output interface, or a communication medium, that is, a network such as a wire, wireless, or optical network, or a carrier wave or a digital signal that propagates through the network. In addition, some or all of the functions realized by the programs may be realized by hardware circuitry or FPGA.

The above-described embodiments and modifications may be combined with each other. While various embodiments and modifications have been described above, the present invention is not limited thereto. Other aspects contemplated within the spirit of the invention are also within the scope of the invention. For example, smart NIC 3 may be used for interfaces between one storage and another storage.

The invention claimed is:

1. An interface module connected to a storage controller and relaying communication between a host and the storage controller, wherein the host and the storage controller use different communication protocols, comprising:
   a plurality of computing cores and a memory,
   wherein at least two of the plurality of computing cores are IO cores that are in communication with the host,
   wherein each of the IO cores has at least a corresponding virtual queue in the memory,
   wherein the interface module further comprises a plurality of external communication ports that communicate with the host,
   wherein the IO cores are allocated to each external communication port based on a resource ratio of the computing core for each external communication port set by the storage controller,
   wherein each IO core is configured to execute a reception process of converting communication data, which includes a command to the storage controller and is output by the host, into a storage interface command and store the communication data in the virtual queue,
   wherein at least one computing core is configured to integrate the storage interface commands in the respective virtual queues of the IO cores to generate an integrated storage interface command and transfer the integrated storage interface command to the storage controller,
   wherein at least one computing core is configured to separate storage interface commands from a command response corresponding to the integrated storage interface command acquired from the storage controller and store the storage interface commands into respective corresponding virtual queues of the IO cores,
   wherein each IO core is configured to execute a transmission process including obtaining a storage interface command from the virtual queue and converting the storage interface command to communication data to be sent to the host,
   wherein IO core identifiers (IDs) are stored in respective correspondence with task IDs,
   wherein a task ID is added to the storage interface command stored in the virtual queue,
   wherein the at least one computing core is configured to determine the virtual queue for storing the storage interface command based on the task ID included in the storage interface command, and
   wherein, within a same communication session with the host, a same IO core, among the at least two IO cores, performs the reception process and the transmission process.

2. The interface module according to claim 1,
   wherein a communication protocol is applied for each external communication port is set, and
   wherein the IO cores perform conversion between the communication data and the storage interface command based on the communication protocol that is applied by each assigned external communication port.

3. The interface module according to claim 1,
   wherein each of the computing cores is configured to execute any of the reception processing, the transmission processing, and the queue operation.

4. The interface module according to claim 1,
   wherein a part of a first computing core performs the reception process and the transmission process but does not perform the queue operation, and
   wherein a second computing core performs the queue operation but does not perform the reception process and the transmission process.

5. A computing device comprising:
   an interface module including a plurality of external communication ports that communicate with a host;
   a storage controller communicating with the host via the interface module;
   a plurality of computing cores; and
   a memory,
   wherein the host and the storage controller use different communication protocols,
   wherein at least two of the plurality of computing cores are IO cores that are in communication with the host,
   wherein each of the IO cores has at least a corresponding virtual queue in the memory,
   wherein the IO cores are allocated for each external communication port based on a resource ratio of the computing cores for each external communication port set by the storage controller, wherein each IO core is configured to execute a reception process of converting communication data, which includes a command to the storage controller and is output by the host, into a storage interface command and store the communication data in the virtual queue, wherein at least one computing core is configured to integrate the storage interface commands in the respective virtual queues of the IO cores to generate an integrated storage interface command and transfer the integrated storage interface command to the storage controller, wherein at least one computing core is configured to separate storage interface commands from a command response corresponding to the integrated storage interface command acquired from the storage controller and store the storage interface commands into respective corresponding virtual queues of the IO cores, wherein each IO core is configured to execute a transmission process including obtaining a storage interface command from the virtual queue and converting the storage interface command to communication data to be sent to the host, wherein IO core identifiers (IDs) are stored in respective correspondence with task IDs, wherein a task ID is added to the storage interface command stored in the virtual queue, wherein the at least one computing core is configured to determine the virtual queue for storing the storage interface command based on the task ID included in the storage interface command, and wherein, within a same communication session with the host, a same IO core, among the at lest two IO cores, performs the reception process and the transmission process.

6. A communication method for relaying communication with a host and a storage controller executed by an interface module which comprises a plurality of computing cores and memory, the module being locally connected to the storage controller, the method comprising;

communicating, by at least two of the plurality of computing cores and a plurality of external communication ports, with the host, wherein the IO cores are allocated to each external communication port based on a resource ratio of the computing core for each external communication port set by the storage controller;

storing, in the memory, a plurality of virtual queues in the memory, each virtual queue respectively corresponding to each computing core, wherein the storage controller includes one command queue and one reception queue, and wherein a number of virtual queues is greater than a number of queues in the storage controller;

executing, by each IO core, a reception process of converting communication data including a command to the storage controller that is output from the host into a storage interface command and storing the storage interface command in the virtual queue;

integrating, by at least one computing core, the storage interface commands in the respective virtual queues of the IO cores to generate an integrated storage interface command and transferring the integrated storage interface command to the storage controller;

separating, by at least one computing core, storage interface commands from a command response corresponding to the integrated storage interface command acquired from the storage controller and store the storage interface commands into respective corresponding virtual queues of the IO cores; and executing, by each IO core, a transmission process including obtaining a storage interface command from the virtual queue and converting the storage interface command to communication data to be sent to the host, wherein IO core identifiers (IDs) are stored in respective correspondence with task IDs, wherein a task ID is added to the storage interface command stored in the virtual queue, wherein the at least one computing core is configured to determine the virtual queue for storing the storage interface command based on the task ID included in the storage interface command, and wherein within a same communication session with the host, a same IO core, among the at least two IO cores, executes the reception process and the transmission process.

* * * * *